US009013716B2

(12) United States Patent
Monks

(10) Patent No.: US 9,013,716 B2
(45) Date of Patent: Apr. 21, 2015

(54) POSITIONING DEVICE FOR AN OPTICAL TRIANGULATION SENSOR

(71) Applicant: Third Dimension Software Limited, Bristol (GB)

(72) Inventor: Tim Monks, Bristol (GB)

(73) Assignee: Third Dimension Software Limited, Bristol (GB)

( * ) Notice: Subject to any disclaimer, the term of this patent is extended or adjusted under 35 U.S.C. 154(b) by 200 days.

(21) Appl. No.: 13/686,340

(22) Filed: Nov. 27, 2012

(65) Prior Publication Data

US 2014/0146327 A1    May 29, 2014

(51) Int. Cl.
*G01B 11/14* (2006.01)
*G01B 11/25* (2006.01)
*G01B 11/02* (2006.01)
*G01S 17/48* (2006.01)

(52) U.S. Cl.
CPC .............. *G01B 11/25* (2013.01); *G01B 11/026* (2013.01); *G01S 17/48* (2013.01)

(58) Field of Classification Search
CPC ...... G01B 11/026; G01B 11/14; G01B 11/00; G01B 11/0608; G01B 11/24; G01S 17/48
USPC .......................... 356/600, 604, 616, 614, 623
See application file for complete search history.

(56) References Cited

U.S. PATENT DOCUMENTS

| 5,076,697 | A | * | 12/1991 | Takagi et al. | 356/603 |
| 5,416,590 | A | * | 5/1995 | Stover et al. | 356/623 |
| 5,999,265 | A | * | 12/1999 | Dalancon et al. | 356/614 |
| 6,747,745 | B2 | * | 6/2004 | Ishikawa et al. | 356/614 |
| 7,542,135 | B2 | | 6/2009 | Mead et al. | |
| 2010/0195116 | A1 | | 8/2010 | Monks et al. | |
| 2011/0310399 | A1 | * | 12/2011 | Keshavmurthy et al. | 356/605 |

* cited by examiner

*Primary Examiner* — Tarifur Chowdhury
*Assistant Examiner* — Isiaka Akanbi
(74) *Attorney, Agent, or Firm* — Nicholas B. Trenkle; Stites & Harbison PLLC

(57) ABSTRACT

The invention provides a positioning device for locating a planar light beam emitted by an optical triangulation sensor across a diameter of a hole formed in a surface of an object. The positioning device has an adjustable guiding element which is capable of locating an optical triangulation sensor at the same distance away from holes have a range of diameters. The guiding element is movably mounted relative to a platform that is fixed to the optical triangulation sensor. The guiding element comprises a body which is insertable into the hole, the body having a pair of contact surfaces for contacting diametrically opposed portions of the hole, the pair of contact surfaces being opposed to each other in a direction orthogonal to the plane of the planar light beam.

13 Claims, 5 Drawing Sheets

POSITIONING DEVICE FOR AN OPTICAL TRIANGULATION SENSOR

FIELD OF THE INVENTION

This invention relates to measurement apparatus which uses triangulation principles to measure the physical geometry of articles and/or their relative position to each other. For example, the invention may be used with a laser triangulation sensor. In particular, the present invention concerns positioning the planar light beam of an optical triangulation sensor with respect to a feature on a measurement surface to facilitate interpretation of a captured image.

BACKGROUND TO THE INVENTION

Optical measurement systems which use a laser triangulation sensor to obtain dimensional information about objects are known. For example, such systems may be arranged to determine the distance of objects from the sensor or the profile of objects within the field of view of the sensor.

Referring to FIG. 1, a conventional laser triangulation measurement device 1 comprises a light source 2 e.g. laser which is arranged to project a planar beam 4 (e.g. sheet) of light. The planar beam 4 is incident as a line 8 on an object or objects 5, 6 which lie in the field of view 7 of the device 1. Light reflected from the incident line 8 is collected by an imaging device 3, which may be a camera (e.g. having a charge coupled device (CCD) or an active pixel sensor (CMOS) device).

The images captured by the imaging device 3 are processed to determine a data representation of the physical geometry of the objects 5, 6. The processing may involved reference to a calibrated look up table or the like. Such processing is known.

FIG. 2 depicts two dimensions that may be determined using the data representation. The separation (gap G) or planar misalignment (mismatch or flush F) between adjacent surfaces may be determined, e.g. by performing suitable mathematical operations (e.g. line/radius fitting).

An example of a conventional optical triangulation sensor is the GapGun, manufactured by Third Dimension Software Limited.

It is often desirable to measure accurately the diameter (or radius) or edge profile of a hole formed in a measurement surface. For example, it may be particularly useful for measuring the edge profile of a countersink (i.e. a hole whose opening is tapered to receive a conical screw head or the like). To perform measurements of this type using an optical triangulation sensor it is desirable for the measurement axis (i.e. the line formed on the measurement surface when the planar light beam is projected thereon) to lie across the centre of the hole (i.e. on a diameter). For accurate measurements, the axis of the hole preferably lies in the plane of the light beam.

Often this is done by eye, e.g. relying on a user's judgement. This limits the accuracy and repeatability of measurements.

US 2010/0195116, which is incorporated herein by reference, disclosed an optical triangulation sensor having a guide element for centering the planar light beam across a hole. The guide element comprises a body receivable in the hole, the body having contact surfaces for abutting the hole circumference, the contact surfaces lying on a virtual conical surface whose axis is in the plane of the light beam. A void is provided in the body at each intersection between the virtual conical surface and the plane of the light beam to define a path for the planar light beam from the light source to the edge of the hole.

U.S. Pat. No. 7,542,135 discloses an alternative solution, in which the self centering device includes a conical cone-shaped member adapted to mate with the countersink, the conical cone-shaped member having a slot extending partially therethrough to allow the laser beam to pass across the countersink and hole.

SUMMARY OF THE INVENTION

At its most general, the present invention provides a positioning device having an adjustable guiding element which is capable of locating an optical triangulation sensor at the same distance away from holes have a range of diameters. The known guide elements described above caused the sensor to be at different distances from the hole depending on the diameter of the hole. The invention may increase the range of hole sizes that can be accurately located in the measurable range of the sensor, and may generally provide a more consistent measurement position for the sensor.

According to the invention, there is provided a positioning device for locating a planar light beam emitted by an optical triangulation sensor across a diameter of a hole formed in a surface of an object, the positioning device comprising: a platform that is securable to the optical triangulation sensor, the platform having a mounting portion for abutting the surface of the object and an aperture through which the planar light beam is transmittable; a guiding element mounted on the platform and movable with respect to the platform along an adjustment path that extends through the aperture, wherein the guiding element comprises a body which is insertable into the hole, the body having a pair of contact surfaces for contacting diametrically opposed portions of the hole, the pair of contact surfaces being opposed to each other in a direction orthogonal to the plane of the planar light beam.

In use, the positioning device is placed on the surface having the hole to be measured so that the mounting portion of the platform contacts the surface. The positioning device can be moved over the surface until the body of the guiding element locates in the hole, whereby the pair of opposed contact surfaces abut opposite sides of the hole, i.e. parts of the edge or the inside wall of the hole diametrically opposite each other. This abutment resists further movement of the positioning device in the direction between the opposed contact surfaces. Since this direction is orthogonal to the plane of the planar light beam, the positioning device therefore fixes the position of the planar light beam across the hole.

The guiding element may be slidable relative to the platform. For example, the guiding element may comprise a rail which is slidable through a cooperating aperture formed in the platform. Alternatively, the platform may comprise the rail and the guiding element may comprise the cooperating aperture. The guiding element may slidable along a straight linear path, whereby the adjustment path is a straight line. Alternatively, the guiding element may be pivotally mounted on the platform, e.g. via a hinge or pivot mount, whereby the adjustment path is a curve. In this arrangement, the body may move along an arc relative to the platform.

The body may be a planar element having a tapered end. The plane of the planar element is preferably orthogonal to the planar light beam, whereby the pair of opposed contact surface are provided by opposite edges of the tapered end. The tapered end may be part of the planar element that can protrude below the mounting portion platform along the adjustment path. The tapering may be a decrease in distance between the contact surfaces along a line normal to the adjustment path along the planar element towards its end. The opposed edges of the tapering surface may be curved, e.g. in a concave, convex or linear manner. For example, the curved edges may curve outwardly as they extend away from the end of the planar element.

Where the adjustment path is a straight line, the opposed contact surfaces are preferably symmetrical about the adjustment path. Where the adjustment path is curved, the contact surface may not display symmetry.

One or both of the contact surfaces may have a convex profile, i.e. may present a laterally rounded surface that corresponds to the curvature of the edge of the hole. In one embodiment, the body may be a planar element and one of the pair of contact surfaces (e.g. the front contact surface) may be a convex surface extending laterally away from one edge of the planar element. The convex surface may thus resemble a beak-like structure on one edge of the planar element. The beak-like structure may be symmetric about the plane of the planar element. This configuration may assist in self-centering the body in the hole. It may be particularly useful when measuring countersunk holes because a reaction force from the sloped surfaces of the countersink on the convex surface may act to push the guide surface further into the hole.

The positioning device may include a biasing element arranged to urge the guiding element along the adjustment path through the aperture. In use, the biasing element thus acts to push the guiding element into the hole to be measured, thereby assisting accurate location. The guiding element and/or the platform may include a stop portion for limiting the movement of the guiding element along the adjustment path, e.g. to prevent the guiding element from being pushed off the platform.

The positioning device of the invention may be an integral part of or a detachable module for an optical triangulation sensor for measuring a hole formed in a surface of an object. An optical triangulation sensor having a positioning device as set out above may be an independent aspect of the present invention. The sensor may include a light source arranged to emit a planar light beam, and a detector located out of the plane of the planar light beam for detecting light from the planar light beam that is reflected at an angle to the plane of the planar light beam.

The light source may include a laser. Any laser used in conventional optical triangulation sensor may be suitable. The laser may be class 3 or lower. For example, it may be a class 2M or 3R. The intensity of the laser may be adjustable (e.g. automatically adjustable) for different optical properties of surfaces to be measured. Alternatively, the light source may comprise one or more LEDs.

The detector may be any suitable imaging device, e.g. a camera incorporating a charge coupled device (CCD) or an active pixel sensor (e.g. CMOS device).

BRIEF DESCRIPTION OF THE DRAWINGS

Embodiments of the invention are described below with reference to the accompanying drawings, in which.

DETAILED DESCRIPTION; FURTHER OPTIONS AND PREFERENCES

The embodiments discussed below may be applied as an enhancement to a conventional optical triangulation sensor, e.g. the GapGun sensor manufactured by Third Dimension Software Limited, mentioned above.

Figure 1:
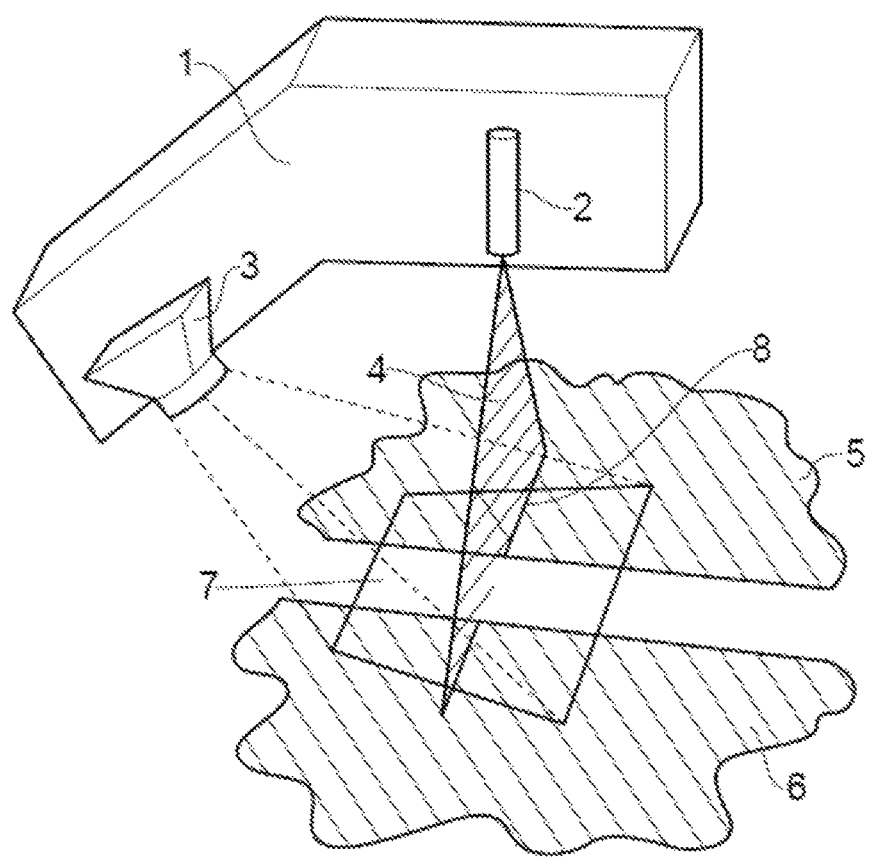
FIG. 1 is a schematic diagram of a conventional laser triangulation sensor and is discussed above.
Figure 2:
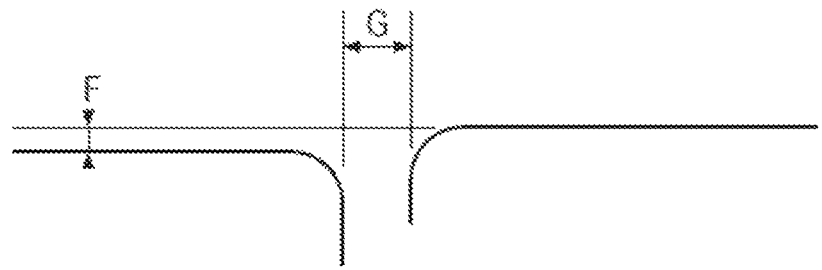
FIG. 2 is a cross-sectional view of a junction between two components illustrated a gap and flush condition and is also discussed above.
Figure 3:
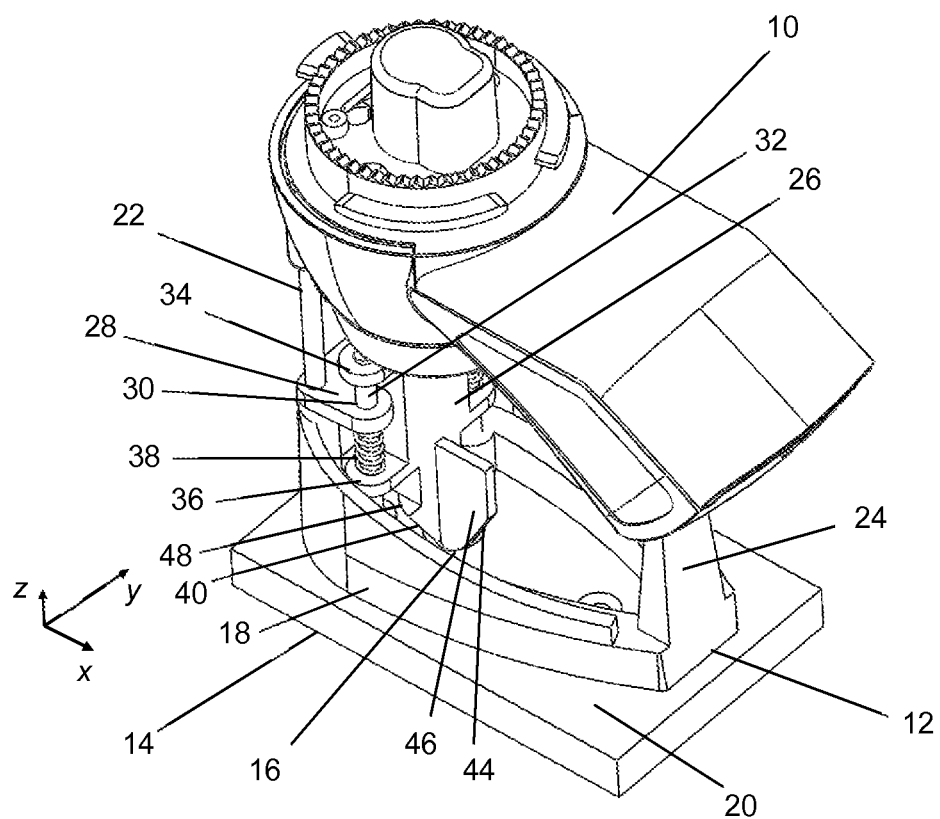
FIG. 3 is a perspective view of an optical triangulation sensor having a positioning device that is an embodiment of the invention.
Figure 4:
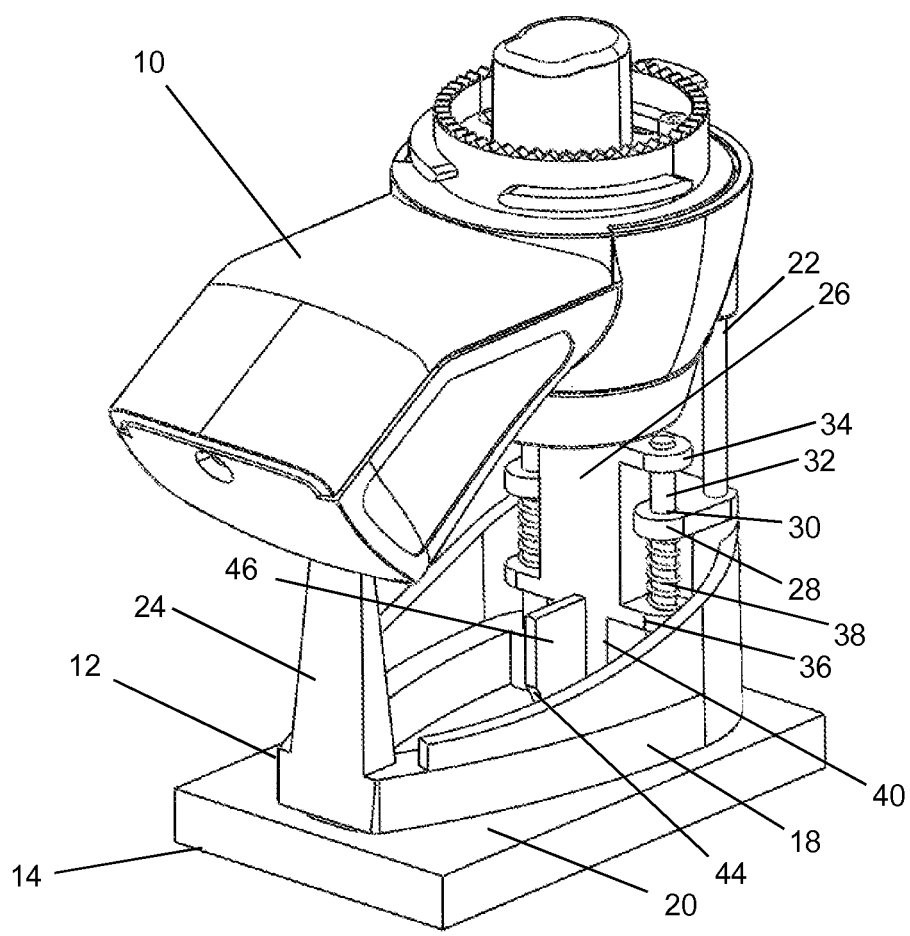
FIG. 4 is another perspective view of the optical triangulation sensor shown in FIG. 3.
Figure 5:
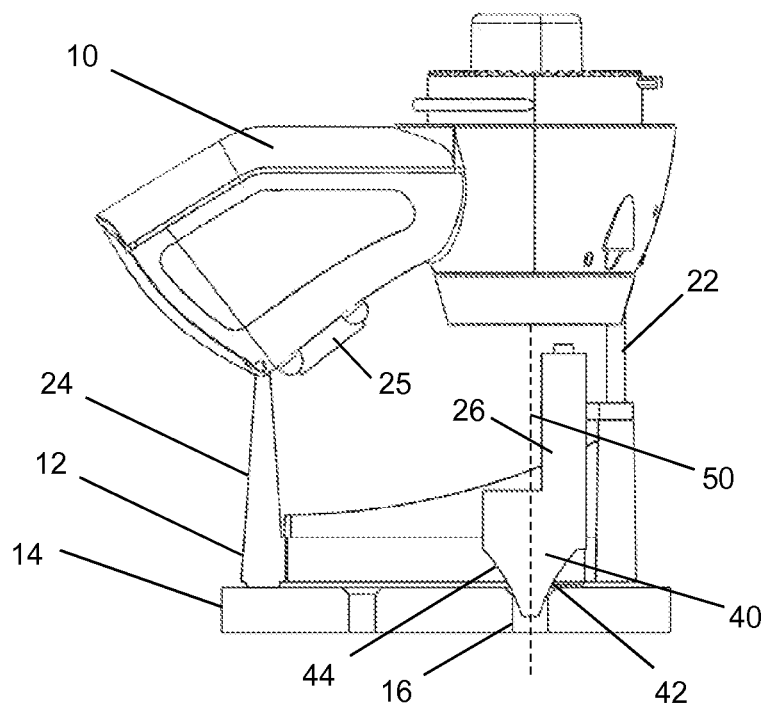
FIG. 5 is a partly cut away side view of the optical triangulation sensor shown in FIG. 3.

FIGS. 3 and 4 shows a optical triangulation sensor 10 having a positioning device 12 that is an embodiment of the invention mounted on a workpiece 14 that has a countersunk hole 16 formed therein. The positioning device 12 comprises a platform 18 whose underside engages the top surface 20 of the workpiece 14. The platform 18 comprises a frame that defines an aperture through which the top surface 20 is visible. The platform 18 have a pair of upstanding front struts 22 and a rear strut 24 for attaching to opposite ends of the optical triangulation sensor 10. The optical triangulation sensor 10 is therefore secured in a fixed position with respect to the platform 18. The fixed position is such that a planar light beam emitted by a light source in the optical triangulation sensor 10 is directed towards the top surface 20 visible in the aperture of the platform 18, to project a line of light on the top surface 20 In this embodiment, the planar light beam 50 is in the y-z plane, whereby the line of light is in a lateral direction across the aperture (along the y-axis illustrated in FIG. 3), as shown in FIG. 5. The line is therefore orthogonal to the forward direction (along the x-axis) from the rear strut 24 to the front struts 22. The aperture also provides a clear line of sight for the image detector 25 mounted in the optical triangulation sensor. The platform 18 is arranged so that the field of view of the sensor is encompasses the path taken by the planar light beam through the aperture.

The platform 18 has a guiding element 26 movably mounted on it. In this embodiment, the platform 18 has a bracket 28 which projects rearward from each front strut 22. The bracket 28 has a guide aperture 30 formed through it. The guiding element 26 includes a pair of rails 32 disposed on opposite sides of the guiding element 26. Each rail is slidably mounted in a respective guide aperture to permit the guiding element to move up and down in a linear manner (along the z-axis). Each rail 32 extends between a pair of laterally projecting flanges 34, 36. The flanges limit the extent of movement of the guiding element 26 relative to the platform 18. A spring 38 is mounted between the base of the bracket 28 and the top of each bottom flange 36. The spring 38 urges the guiding element 26 downwards, i.e. through the aperture, which assists in locating it in the countersunk hole 16. In this embodiment, each spring 38 is a helical spring wound around a respective rail 32.

The bottom end of the guiding element 26 includes a body 40 which is insertable into the hole to engage the sides of the hole and locate the planar light beam accurately with respect to the hole 16. The body 40 comprises a front contact surface 42 (see FIG. 5) and a rear contact surface 44, which provide opposed points of contact with the hole 16 in a direction orthogonal to the line projected by the planar light beam. The opposed points of contact thus resist forward and backward movement of the optical triangulation sensor when the body 40 is in the hole 16, i.e. resist displacement of the planar light beam along the x-axis. The springs 38 ensure that the body in urged into full engagement with the hole 16.

The body 40 includes a rearward projecting plate 46, whose outer edge provides the rear contact surface 44. The rearward projecting plate 46 tapers towards the bottom of the body 40. The body 40 can therefore fit within a range of hole diameters.

The body 40 includes a forward projecting rounded guide 48, whose outer surface is the front contact surface 44. Similarly to the rearward projecting plate 46, the forward projecting rounded guide 48 tapers towards the bottom of the body 40. An example of the shape of taper is shown in FIG. 5, where the front and rear contact surfaces 44, 46 describe a concave shape. Convex or linear tapering is also possible. The rounded guide 48 is positioned behind the path for the planar light beam 50 (see FIG. 5), so it does not interfere with the line of light across the hole 16. The rounded nature of the guide 48 assists in centering the body 40 in the hole 16.

FIG. 5 shows a partly cut away side view of the positioning device 12 shown in FIGS. 3 and 4. Half of the platform 18 is omitted to shown the construction of the body more clearly. In FIG. 5 the body 40 is inserted in the hole such that the front and rear contact surfaces 42, 44 engage with the opposite sides of the hole 16. The extent to which the body 40 penetrates into the hole depends on the size and type of the hole (e.g. diameter and angle and size of the countersink). However, the extent of penetration is reflected in the position of the slidable guiding element 26 relative to the platform 18. The position of the light source and detector 25 relative to the hole is thus not affected by the size of the hole. The invention may thus permit accurate location of an optical triangulation sensor relative to a wide range of hole shapes and sizes without affecting the position of the light source and detector relative to the hole.

Figure 6:
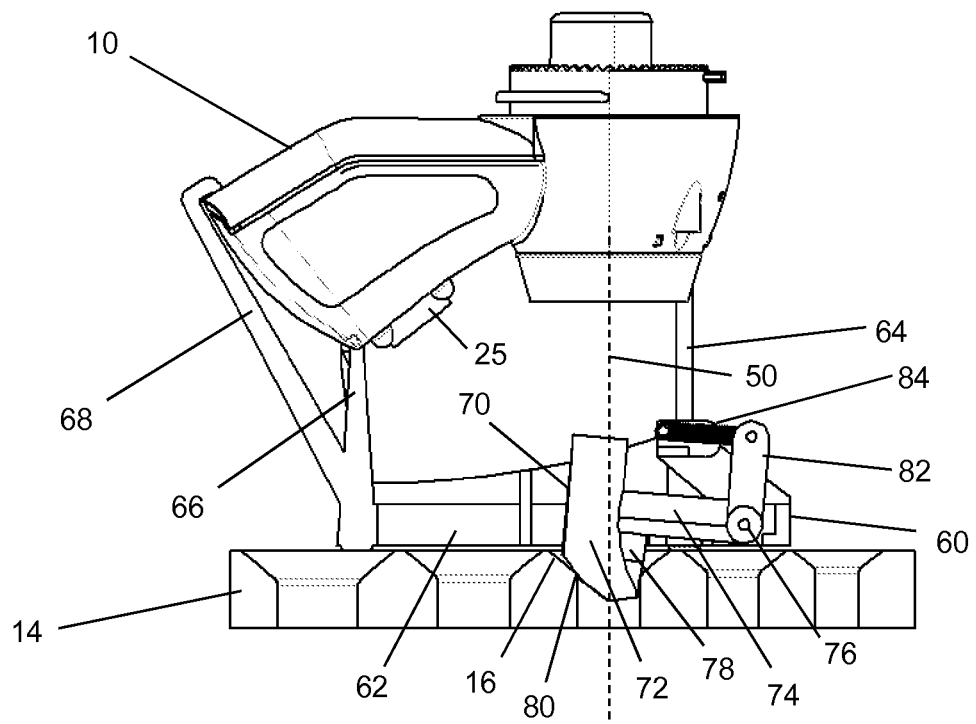
FIG. 6 is a partly cut away side view of an optical triangulation sensor having a positioning device that is another embodiment of the invention.
Figure 7:
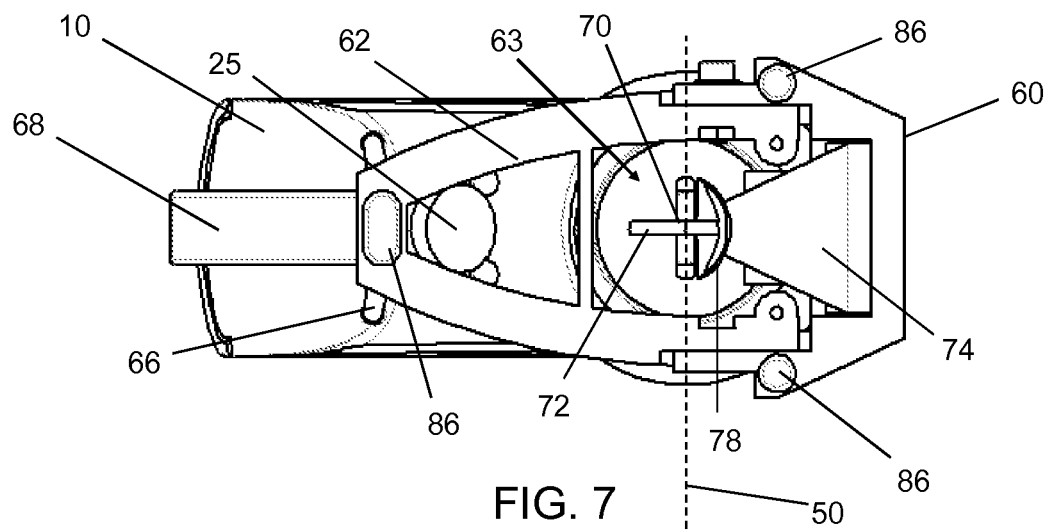
FIG. 7 is upward view from base of the optical triangulation sensor shown in FIG. 6.
Figure 8:
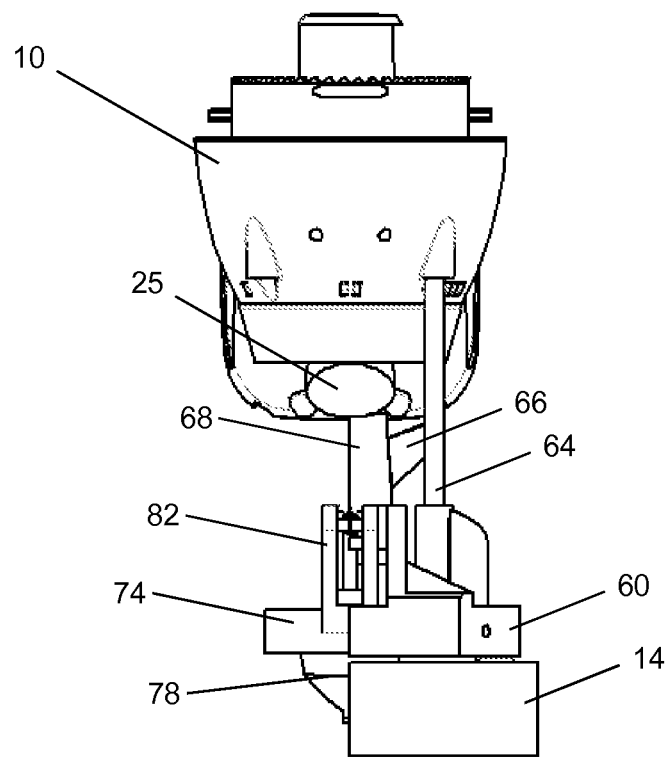
FIG. 8 is a partly cut away front view of the optical triangulation sensor shown in FIG. 6.

FIGS. 6, 7 and 8 show various views of a positioning device 60 that is another embodiment of the invention. FIG. 6 is a partly cut away side view of an optical triangulation sensor having the positioning device 60 mounted thereon. The positioning device 60 comprises a platform 62 having a pair of front struts 64 (only one of which is visible in the cut-away views of FIGS. 6 and 8) and a pair of rear struts 66 (see FIG. 7) and rear clip 68, which permit the positioning device to be mounted on an optical sensor 10 in a similar manner to the positioning device 12 discussed above.

The platform 62 has a similar shape to the platform 18 discussed above, in that its underside is adapted to abut the top surface 20 of the workpiece 14 in which a hole 16 for measurement is formed, and in that it defines an aperture 63 (seen most clearly in FIG. 7) through which the hole 16 to be measured is visible in the field of view of the sensor 25 and exposed to the planar light beam 50 emitted from a light source in the optical triangulation sensor 10.

The embodiment in FIGS. 6 to 8 differs from the embodiment in FIGS. 3 to 5 in that a guiding element 70 for inserting into the hole 16 to be measured is pivotably mounted on the platform 62. The guiding element 70 is thus movable relative to the platform along an arc. The guiding element 70 includes a planar body part 72 for locating across a hole to be measured in a direction perpendicular to the plane of the planar light beam 50, and an arm 74 that extends forwardly from the body 72 in a direction away from the plane of the planar light beam 50. The arm is rotatable about a pin 76 fixed at the front of the platform 62. The axis of rotation is parallel to the plane of the planar light beam 50 The length of the arm 72 defines the radius of the arc through which the body 72 moves.

The body 72 comprises a front contact surface 78 and a rear contact surface 80, which provide opposed points of contact with the hole 16 in a direction orthogonal to the line projected by the planar light beam. The opposed points of contact thus resist forward and backward movement of the optical triangulation sensor in a similar manner to the positioning device discussed with respect to FIGS. 3 to 5. The planar nature of body 72 enables the planar light beam 50 to access the hole 16. FIG. 7 shows that the width of the planar body 72 is narrower than the beam emitting aperture when view along the planar light beam.

In this embodiment, the front contact surface 78 spreads out in a lateral direction from the edge of the planar body 72 to form a curved beak-like structure. As shown in FIG. 7, when viewed from below, the beak-like structure presents a convex surface to the edge of the hole. The convex shape of this surface may assist with the lateral alignment of the guiding element 70 in the hole. The rear contact surface 80 is a curved surface, which together with the front contact surface forms a tapering end of the guiding element 70. The guiding element will tend to descend into the hole until the front and rear contact surfaces abut diametrically opposed edges of the hole. In this position the guiding element resists lateral movement of the positioning device 60 relative to the hole. Repeatable measurements can therefore be ensured.

The guiding element 70 includes a upstanding part 82 which is connected to the platform 62 at the base of the front strut 64 via a spring 84. The spring 84 acts to urge the guiding element 70 downwards through the aperture in the platform 62, i.e. into contact with the hole 16.

The base of the positioning device 60 has three contact pads 86 formed thereon for providing a stable three-point abutment on the surface of the object.

The invention claimed is:

1. A positioning device for locating a planar light beam emitted by an optical triangulation sensor across a diameter of a hole formed in a surface of an object, the positioning device comprising:
    a platform that is securable to the optical triangulation sensor, the platform having a mounting portion for abutting the surface of the object and an aperture through which the planar light beam is transmittable;
    a guiding element mounted on the platform and movable with respect to the platform along an adjustment path that extends through the aperture,
    wherein the guiding element comprises a body which is insertable into the hole, the body having a pair of contact surfaces for contacting diametrically opposed portions of the hole, the pair of contact surfaces being opposed to each other in a direction orthogonal to the plane of the planar light beam.

2. A positioning device according to claim 1, wherein the guiding element comprises a rail that is slidable through a guiding aperture formed in the platform.

3. A positioning device according to claim 2, wherein the guiding element is slidable along a straight linear path, whereby the adjustment path is a straight line.

4. A positioning device according to claim 1, wherein the guiding element is pivotally mounted on the platform, whereby the adjustment path is a curve.

5. A positioning device according to claim 1, wherein the body is a planar element having a tapered end, the plane of the planar element being orthogonal to the planar light beam, so that the pair of opposed contact surfaces are opposite side edges of the tapered end.

6. A positioning device according to claim 1, wherein the guiding element is movable to project the tapered end below the mounting portion platform along the adjustment path.

7. A positioning device according to claim 5, wherein the opposed side edges of the tapering surface curve outwardly as they extend away from the end of the planar element.

8. A positioning device according to claim 1, wherein the body is a planar element and wherein one of the pair of contact surfaces is a convex surface extending laterally away from one edge of the planar element.

9. A positioning device according to claim 1 including a biasing element arranged to urge the guiding element along the adjustment path.

10. An optical triangulation sensor for measuring a hole formed in a surface of an object, the sensor comprising:
- a light source arranged to emit a planar light beam;
- a detector located out of the plane of the planar light beam for detecting light from the planar light beam that is reflected at an angle to the plane of the planar light beam; and
- a positioning device for locating the planar light beam across a diameter of the hole formed in the surface of the object, the positioning device comprising:
  - a platform that is secured to the detector, the platform having a mounting portion for abutting the surface of the object and an aperture through which the planar light beam is transmittable;
  - a guiding element mounted on the platform and movable with respect to the platform along an adjustment path that extends through the aperture,
  - wherein the guiding element comprises a body which is insertable into the hole, the body having a pair of contact surfaces for contacting diametrically opposed portions of the hole, the pair of contact surfaces being opposed to each other in a direction orthogonal to the plane of the planar light beam.

11. An optical triangulation sensor according to claim 10, wherein the light source includes a laser or LED.

12. An optical triangulation sensor according to claim 10, wherein the detector is an imaging device.

13. An optical triangulation sensor according to claim 12, wherein imaging device includes a charge coupled device (CCD) or an active pixel sensor.

* * * * *